(No Model.)

A. NELSON.
WHEEL.

No. 513,525. Patented Jan. 30, 1894.

WITNESSES.
Chas H Gleason
Fred R Young

Andrew Nelson
Inventor
per
By E. H. Gleason
his ATTORNEY.

THE NATIONAL LITHOGRAPHING COMPANY,
WASHINGTON, D. C.

UNITED STATES PATENT OFFICE.

ANDREW NELSON, OF MOLINE, ILLINOIS.

WHEEL.

SPECIFICATION forming part of Letters Patent No. 513,525, dated January 30, 1894.

Application filed October 17, 1893. Serial No. 488,434. (No model.)

*To all whom it may concern:*

Be it known that I, ANDREW NELSON, a citizen of the United States, residing at Moline, in the county of Rock Island and State of Illinois, have invented a certain new and useful Improvement in Suspension Adjustable Spring-Wheels; and I do hereby declare the following to be a full, clear, and exact description of the invention, such as will enable others skilled in the art to which it appertains to make and use the same.

My invention relates to vehicle and other wheels and the object of my improvement is to provide a spring wheel of a suspension and adjustable nature fitted for vehicles, bicycles and various other purposes. I attain this object by the wheel as shown and illustrated in the accompanying drawings, in which—

Figure 1:
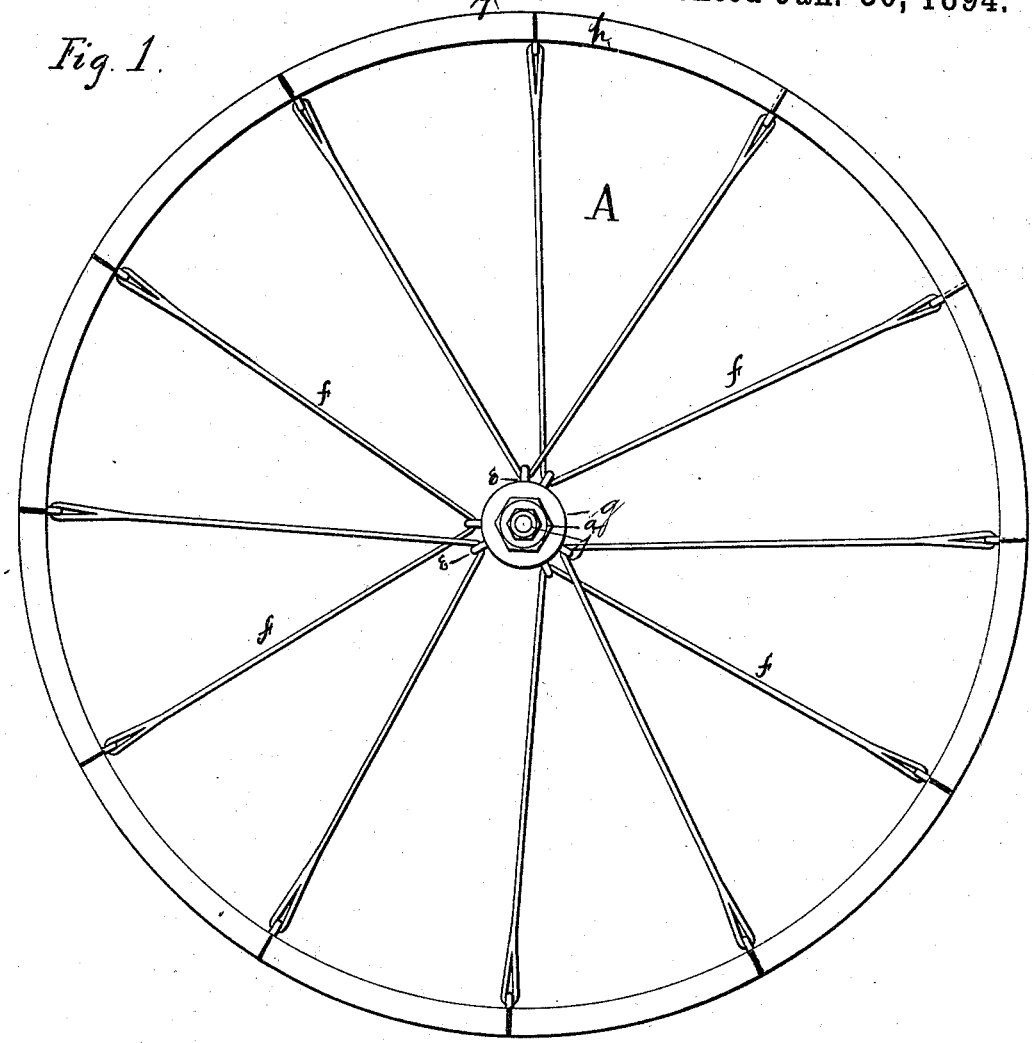
Figure 2:
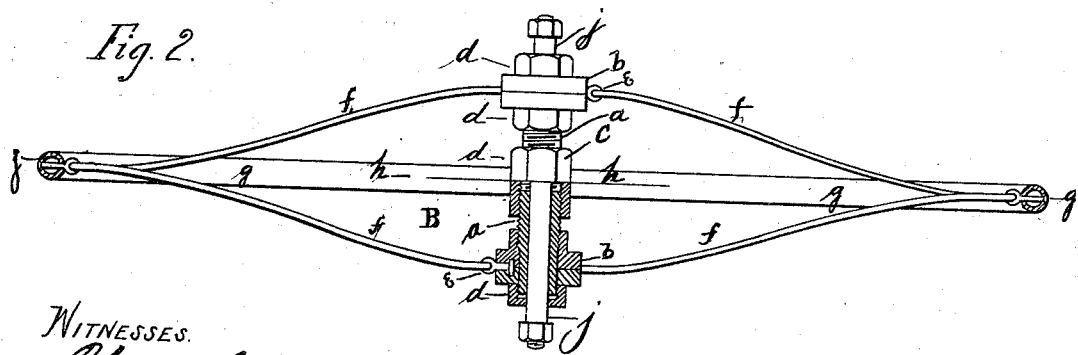

Figure 1 is an upright view of the adjustable wheel A. showing the manner of adjusting and connecting spokes to the hub and tire. Fig. 2 is a central cross-section of the wheel showing the box. B. the collars. nuts. spokes. bolts. axle. tires and manner of connection.

Similar letters refer to different parts throughout the several views.

Hub. B. is composed of metal and is made of two equal parts each threaded at the inner ends. with a right and left hand screw at or near the center of hub. and held together by threaded collar. c. to engage with the threaded ends, and have at the outer ends or sides of the hub. the collars. b. b. which are formed of two equal parts. having half holes. on the facing of each corresponding when placed together. forming a perfect hole and fitted to receive eye bolts. E. E. which when inserted are held secure by a nut or flange (as seen in Fig. 2). The parts being placed together. are held by nuts. d. d. One part of each collar b has a thread to engage with the thread on hub. the other part made to slip over the thread. allowing the spread or extension of hub. which is effected by collar. c. which is threaded to engage with the ends of the hub holding them together. or by turning to the right or left. to extend or elongate the hub. to accommodate the spread or tension of the spokes as may be desired.

The axle box a. a. is made in two parts. each extending to middle of the hub. and opening to correspond to the spread of the hub preventing any movement of the box. Hub. B. can be readily taken apart by loosening nuts. d. d. collars. b. b. and collar. c. when repairs are needed to any part of wheel.

The spokes. f. f. are attached to the eye bolts. e. e. in the hub and to the eye bolts on the inner tire h. by closed or partly closed eye bolts. which pass through the tire h. and firmly attached to the outer tire. g. The spokes from each side of the hub attach. alternately to tire. h. They can be put in in sections or may be two spokes in one piece or one continuous piece for spokes in the wheel and may be made of wire. woven or braided. iron. steel. rods. or wood. When open eye bolts are used. the spokes should be made with solid slot in the ends but a hooked end of spokes for close eye bolts. The form of spokes. in order to give the greatest elasticity should be bent largely at the lower or hub part.

The wheel can be used for various purposes. viz., bicycles, vehicles. and machinery, &c. The tires h and g. are connected by means of an inside clamp in place of welding and may be made of flat or round iron, steel or tubing and tire g fitted for rubber band if desired.

Having thus described my invention, what I claim, and desire to secure by Letters Patent, is—

1. In a wheel, the combination with the tire and the spokes, of a right and left hand threaded hub portion, two collars at each end of the said hub portion, and eye bolts having their inner ends enlarged or flanged and seated in corresponding recesses in the meeting faces of the said collars, the latter being simultaneously separated or brought together on relatively turning the said oppositely threaded hub portion, substantially as set forth.

2. The herein described wheel, composed of a tire, a two part hub portion having the inner ends of the said parts provided with, respectively, a right and a left hand thread, a sleeve connecting the said parts and adapted to separate and bring them together, pairs of collars at the outer ends of the hub portions independently adjustable thereon and held between nut portions, eye bolts flanged at their inner ends and held between the said collars by being seated in recesses in the meeting faces thereof, and spokes secured at their outer ends to the tire and at their inner ends to the said eye bolts, substantially as specified.

In testimony whereof I affix my signature in presence of two witnesses.

ANDREW NELSON.

Witnesses:
ERIK JOHANSON,
FRED R. YOUNG.